US010198192B2

(12) United States Patent
Wakhare et al.

(10) Patent No.: US 10,198,192 B2
(45) Date of Patent: Feb. 5, 2019

(54) SYSTEMS AND METHODS FOR IMPROVING QUALITY OF SERVICE WITHIN HYBRID STORAGE SYSTEMS

(71) Applicant: Veritas Technologies LLC, Mountain View, CA (US)

(72) Inventors: Prasanna Wakhare, Pune (IN); Niranjan Pendharkar, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 102 days.

(21) Appl. No.: 14/673,898

(22) Filed: Mar. 31, 2015

(65) Prior Publication Data

US 2016/0291882 A1 Oct. 6, 2016

(51) Int. Cl.
*G06F 3/06* (2006.01)
*G06F 9/455* (2018.01)

(52) U.S. Cl.
CPC ............ *G06F 3/0613* (2013.01); *G06F 3/061* (2013.01); *G06F 3/0605* (2013.01); *G06F 3/0653* (2013.01); *G06F 3/0665* (2013.01); *G06F 3/0685* (2013.01); *G06F 9/45545* (2013.01); *G06F 2009/45562* (2013.01)

(58) Field of Classification Search
None
See application file for complete search history.

(56) References Cited

U.S. PATENT DOCUMENTS 5,420,983 A * 5/1995 Noya .................. G06F 12/0804 710/30
7,127,568 B2 * 10/2006 Watanabe ............... G06F 3/061 709/235
8,812,744 B1 8/2014 Iyigun et al.
9,274,966 B1 * 3/2016 Chahwan ............ G06F 12/0802
(Continued)

OTHER PUBLICATIONS

VMware vSphere best practices for IBM SAN Volume Controller and IBM Storwize family; by Burbridge; IBM Sep. 2013; as published on the internet at https://www-356.ibm.com/partnerworld/wps/servlet/download/DownloadServlet?id=uEDQaFUbIIZiPCA$cnt&attachmentName=vmware_vsphere_best_practices.pdf&token=MTQ3NTQ4NjU50DgxOQ==locale=en_ALL_ZZ.*
(Continued)

*Primary Examiner* — Reginald G Bragdon
*Assistant Examiner* — Paul M Knight
(74) *Attorney, Agent, or Firm* — FisherBroyles LLP

(57) ABSTRACT

The disclosed computer-implemented method for improving quality of service within hybrid storage systems may include (1) monitoring a performance measurement of a hybrid storage system that includes first and second types of storage devices that handle I/O throughput in connection with an application, (2) determining, based at least in part on the monitored performance measurement, an approximate amount of the I/O throughput handled by the first type of storage device over a period of time, (3) determining, based at least in part on the approximate amount of I/O throughput, a rate at which the application is allowed to deliver subsequent I/O throughput to the hybrid storage system over a
(Continued)

300

Start

Monitor, over a period of time, at least one performance measurement of a hybrid storage system that includes first and second types of storage devices that handle I/O throughput in connection with at least one application
302

Determine, based at least in part on the monitored performance measurement, an approximate amount of the I/O throughput handled by the first type of storage device relative to the second type of storage devivce
304

Determine, based at least in part on the approximate amount of I/O throughput handled by the first type of storage device, a rate at which the application is allowed to deliver subsequent I/O throughput to the hybrid storage system over a subsequent period of time
306

Regulate, based at least in part on the rate at which the application is allowed to deliver the subsequent I/O throughput to the hybrid storage system, the subsequent I/O throughput in connection with the application over the subsequent period of time
308

End subsequent period of time, and then (4) regulating, based at least in part on the rate, the subsequent I/O throughput in connection with the application over the subsequent period of time. Various other methods, systems, and computer-readable media are also disclosed.

20 Claims, 9 Drawing Sheets

(56) References Cited

U.S. PATENT DOCUMENTS

2004/0078534 A1 4/2004 Scheid
2004/0111514 A1* 6/2004 Chase .................... H04L 29/06 709/226
2004/0148484 A1* 7/2004 Watanabe ............... G06F 3/061 711/170
2004/0162941 A1* 8/2004 Aigo ..................... G06F 3/0613 711/114
2005/0286863 A1* 12/2005 Howarth ............. G11B 27/034 386/232
2006/0288159 A1* 12/2006 Haruna ............... G06F 12/0871 711/113
2007/0079103 A1* 4/2007 Mimatsu ............... G06F 3/0605 711/173
2008/0141048 A1* 6/2008 Palmer ................ H04L 67/1008 713/300
2012/0054329 A1 3/2012 Gulati et al.
2012/0239859 A1* 9/2012 Lary ....................... G06F 3/061 711/103
2013/0185531 A1* 7/2013 Emaru .................... G06F 3/061 711/162
2014/0059208 A1* 2/2014 Yan ..................... H04L 43/0817 709/224
2014/0189204 A1* 7/2014 Sugimoto .............. G06F 3/061 711/103
2015/0081981 A1* 3/2015 McKean ............... G06F 12/123 711/136
2015/0120859 A1* 4/2015 Kondo ................ G06F 12/0868 709/213
2015/0286492 A1* 10/2015 Breitgand ........... G06F 9/45558 718/1
2016/0041787 A1 2/2016 Nicolae
2016/0132358 A1* 5/2016 Antony ................ G06F 9/5044 726/4
2016/0162315 A1* 6/2016 Pannem ............. G06F 9/45558 718/1

OTHER PUBLICATIONS

Fanglu Guo; Systems and Methods for Dynamic Load Balancing on Disks; U.S. Appl. No. 14/584,549, filed Dec. 29, 2014.
Niranjan Pendharkar, et al.; Systems and Methods for End-to-End Quality of Service Control in Distributed Systems; U.S. Appl. No. 14/671,092, filed Mar. 27, 2015.
Gulati, Ajay et al., "PARDA : Proportional Allocation of Resources for Distributed Storage Access", http://citeseerx.ist.psu.edu/viewdoc/summary?doi=10.1.1.188.3027&rank=1, as accessed Mar. 3, 2015, (2009).
Gulati, Ajay et al., "Demand based hierarchical QoS using storage resource pools", http://citeseerx.ist.psu.edu/viewdoc/summary?doi=10.1.1.302.9026&rank=1, as accessed Mar. 3, 2015, (2012).
EMC Fast VP for Unified Storage Systems—A Detailed Review, Oct. 2011, EMC White Paper, pp. 4-11.

* cited by examiner

Figure 5:
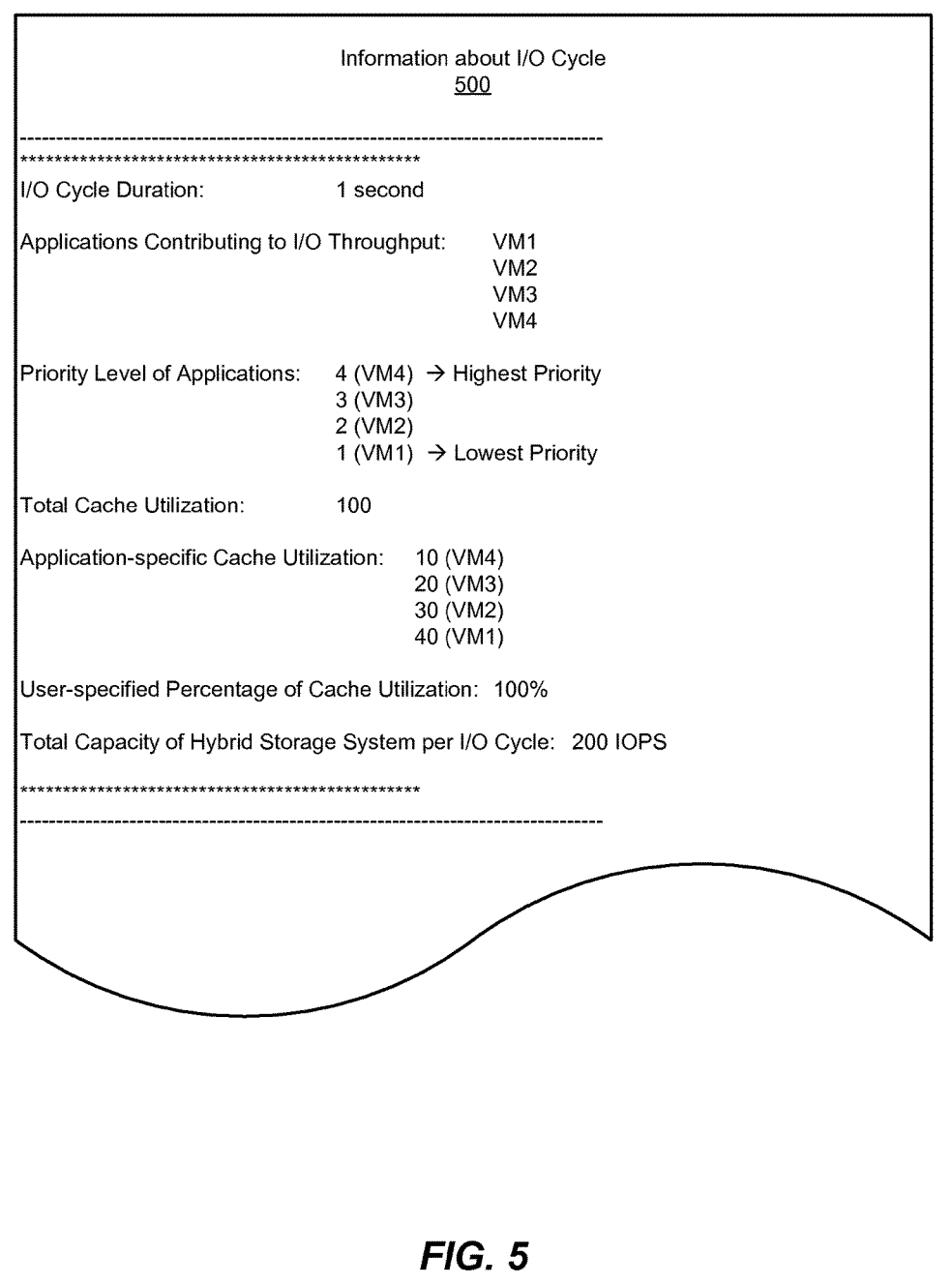

Information about I/O Cycle
500

--------------------------------------------------------------------------------
***********************************************
I/O Cycle Duration: 1 second Applications Contributing to I/O Throughput: VM1
VM2
VM3
VM4

Priority Level of Applications: 4 (VM4) → Highest Priority
3 (VM3)
2 (VM2)
1 (VM1) → Lowest Priority Total Cache Utilization: 100

Application-specific Cache Utilization: 10 (VM4)
20 (VM3)
30 (VM2)
40 (VM1)

User-specified Percentage of Cache Utilization: 100%

Total Capacity of Hybrid Storage System per I/O Cycle: 200 IOPS

Figure 6:
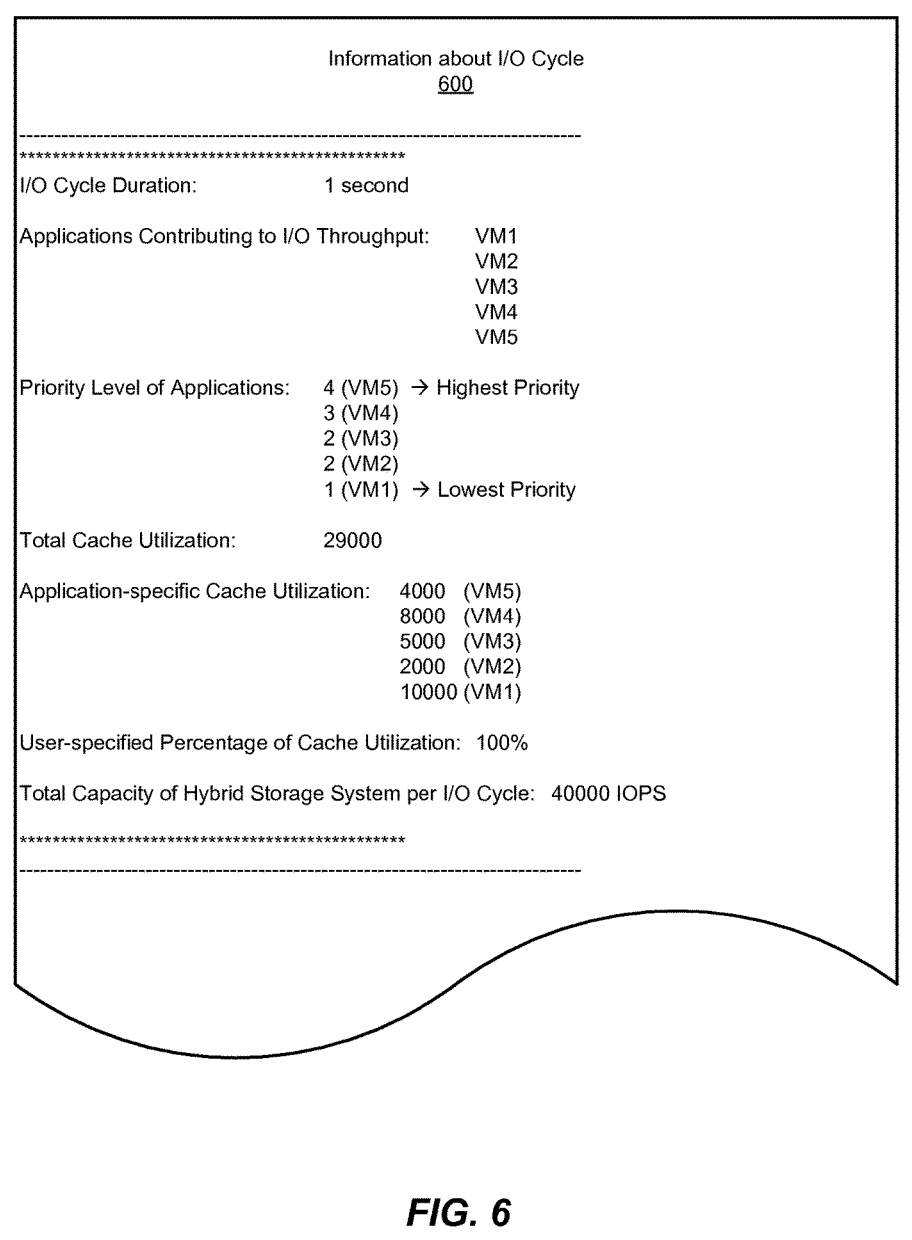

Information about I/O Cycle
600

--------------------------------------------------------------------------------
************************************************

I/O Cycle Duration: 1 second

Applications Contributing to I/O Throughput: VM1
VM2
VM3
VM4
VM5

Priority Level of Applications: 4 (VM5) → Highest Priority
3 (VM4)
2 (VM3)
2 (VM2)
1 (VM1) → Lowest Priority Total Cache Utilization: 29000

Application-specific Cache Utilization: 4000 (VM5)
8000 (VM4)
5000 (VM3)
2000 (VM2)
10000 (VM1)

User-specified Percentage of Cache Utilization: 100%

Total Capacity of Hybrid Storage System per I/O Cycle: 40000 IOPS

Figure 7:
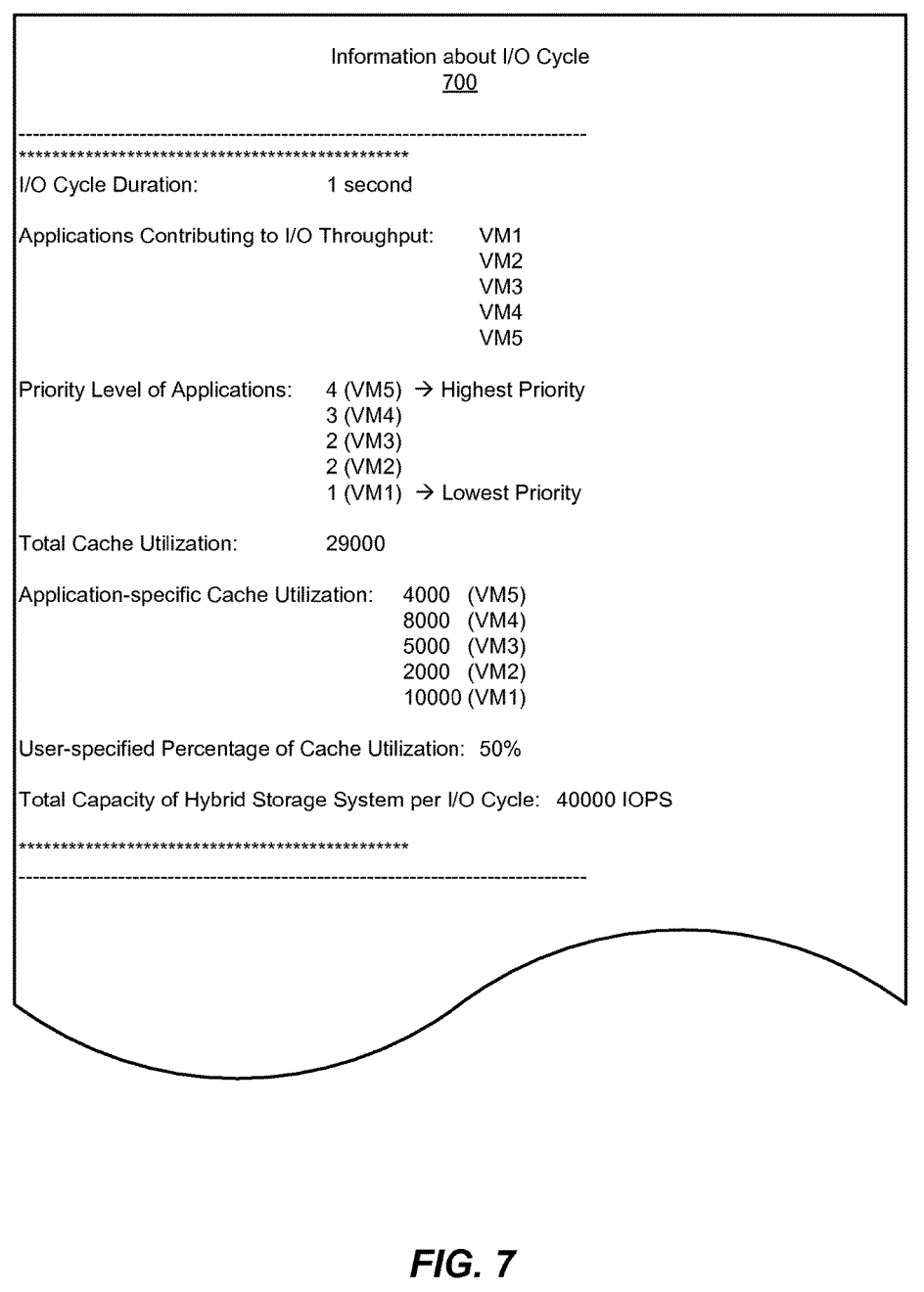

Information about I/O Cycle
700

--------------------------------------------------------------------------------
*************************************************

I/O Cycle Duration: 1 second

Applications Contributing to I/O Throughput: VM1
VM2
VM3
VM4
VM5

Priority Level of Applications: 4 (VM5) → Highest Priority
3 (VM4)
2 (VM3)
2 (VM2)
1 (VM1) → Lowest Priority Total Cache Utilization: 29000

Application-specific Cache Utilization: 4000 (VM5)
8000 (VM4)
5000 (VM3)
2000 (VM2)
10000 (VM1)

User-specified Percentage of Cache Utilization: 50%

Total Capacity of Hybrid Storage System per I/O Cycle: 40000 IOPS

SYSTEMS AND METHODS FOR IMPROVING QUALITY OF SERVICE WITHIN HYBRID STORAGE SYSTEMS

BACKGROUND

Hybrid storage systems often include storage devices of different types and/or speeds. For example, a hybrid storage system may include one or more high-speed storage devices (such as caches) and/or one or more low-speed storage devices (such as disks) that store data used by various Virtual Machines (VMs) running within a network. In this example, the VMs may initiate various Input/Output (I/O) operations (such as reads and/or writes) serviced by the hybrid storage system.

Delivery of such I/O operations from the VMs to the hybrid storage system may be controlled by a Quality of Service (QoS) feature. For example, a conventional QoS feature may deliver several thousand I/O operations from the VMs to the hybrid storage system every second. In this example, the conventional QoS feature may determine how many I/O operations to deliver to the hybrid storage system by assuming that the high-speed storage devices will service a certain number of I/O operations and the low-speed storage devices will service the remaining I/O operations. Unfortunately, since the conventional QoS feature has no way of knowing exactly which I/O operations will be serviced by the high-speed devices or the low-speed devices at the time of arrival, the conventional QoS feature's assumption about the number of I/O operations serviced by the high-speed storage devices as opposed to the low-speed storage devices may be incorrect and/or lead to latency problems within the hybrid storage system.

As an example, the conventional QoS feature may deliver I/O operations from the VMs to the hybrid storage system at a certain rate. In the event that many, if not all, of these I/O operations are serviced by the high-speed storage devices, the hybrid storage system may demonstrate a period of very low latency, thereby potentially giving the conventional QoS feature a false impression that the hybrid storage system is able to service such I/O operations at even higher speeds. As a result, the conventional QoS feature may increase the rate of delivery for the I/O operations such that some of the I/O operations quickly fill up the storage space within the high-speed storage devices and the remaining I/O operations are forced to skip to the low-speed storage devices, thereby potentially leading to a period of very high latency. These back-and-forth changes in latency may cause the conventional QoS feature to repeatedly and/or unstably flip-flop the delivery rates for the I/O operations.

The instant disclosure, therefore, identifies and addresses a need for systems and methods for improving QoS within hybrid storage systems.

SUMMARY

As will be described in greater detail below, the instant disclosure describes various systems and methods for improving quality of service within hybrid storage systems by monitoring a reference I/O throughput cycle handled by different types of storage devices within hybrid storage systems and then regulating a subsequent I/O throughput cycle based at least in part on the amount of I/O operations handled by the different types of storage devices during the reference I/O throughput cycle.

In one example, a computer-implemented method for improving quality of service within hybrid storage systems may include (1) monitoring, over a period of time, at least one performance measurement of a hybrid storage system that includes first and second types of storage devices that handle I/O throughput in connection with at least one application (e.g., at least one VM), (2) determining, based at least in part on the monitored performance measurement, an approximate amount of the I/O throughput handled by the first type of storage device relative to the second type of storage device over the period of time, (3) determining, based at least in part on the approximate amount of I/O throughput handled by the first type of storage device relative to the second type of storage device, a rate at which the application is allowed to deliver subsequent I/O throughput to the hybrid storage system over a subsequent period of time, and then (4) regulating, based at least in part on the rate at which the application is allowed to deliver the subsequent I/O throughput to the hybrid storage system, the subsequent I/O throughput in connection with the application over the subsequent period of time.

In some examples, the method may also include counting the number of I/O operations performed on the first type of storage device in connection with the application over the period of time. Additionally or alternatively, the method may further include counting the number of I/O operations performed on the second type of storage device in connection with the application over the period of time.

In some examples, the first type of storage device may include and/or represent a high-speed storage device, and the second type of storage device may include and/or represent a low-speed storage device. In such examples, the method may also include determining a percentage of the I/O throughput that was serviced by the high-speed storage device as opposed to the low-speed storage device over the period of time. Additionally or alternatively, the method may include factoring the percentage of I/O throughput serviced by the high-speed storage device into a formula used to calculate the rate at which the application is allowed to deliver the subsequent I/O throughput to the hybrid storage system.

In some examples, the method may also include identifying a priority level of the application relative to at least one other application that contributes to the I/O throughput handled by the hybrid storage system over the period of time. In such examples, the method may further include determining the rate at which the application is allowed to deliver subsequent I/O throughput to the hybrid storage system over the subsequent period of time based at least in part on the approximate amount of I/O throughput handled by the first type of storage device relative to the second type of storage device and the priority level of the application relative to the other application. Additionally or alternatively, the method may include factoring the approximate amount of I/O throughput handled by the first type of storage device and the priority level of the application into a formula used to calculate the rate at which the application is allowed to deliver the subsequent I/O throughput to the hybrid storage system.

In some examples, the method may also include determining, based at least in part on the approximate amount of I/O throughput handled by the first type of storage device relative to the second type of storage device, a rate at which another application is allowed to contribute to the subsequent I/O throughput delivered to the hybrid storage system over the subsequent period of time. In such examples, the method may further include regulating, based at least in part on the rate at which the other application is allowed to contribute to the subsequent I/O throughput delivered to the hybrid storage system, the subsequent I/O throughput in connection with the other application over the subsequent period of time.

In some examples, the method may also include allotting, to the application, a number of I/O credits corresponding to an approximate amount of I/O operations that the application is allowed to contribute to the subsequent I/O throughput during the subsequent period of time. In such examples, the method may further include ensuring that the hybrid storage system does not handle a number of I/O operations that exceeds the number of I/O credits in connection with the application during the subsequent period of time.

In some examples, the method may also include preventing the application from delivering a number of I/O operations that exceeds the number of allotted I/O credits to the hybrid storage system over the subsequent period of time. Additionally or alternatively, the method may include preventing the hybrid storage system from performing a number of I/O operations that exceeds the number of allotted I/O credits in connection with the application during the subsequent period of time.

In another example, a system for implementing the above-described method may include (1) a monitoring module, stored in memory, that monitors, over a period of time, at least one performance measurement of a hybrid storage system that includes first and second types of storage devices that handle I/O throughput in connection with at least one application, (2) a determination module, stored in memory, that (A) determines, based at least in part on the monitored performance measurement, an approximate amount of the I/O throughput handled by the first type of storage device relative to the second type of storage device over the period of time and then (B) determines, based at least in part on the approximate amount of I/O throughput handled by the first type of storage device relative to the second type of storage device, a rate at which the application is allowed to deliver subsequent I/O throughput to the hybrid storage system over a subsequent period of time, (3) a regulation module that regulates, based at least in part on the rate at which the application is allowed to deliver the subsequent I/O throughput to the hybrid storage system, the subsequent I/O throughput in connection with the application over the subsequent period of time, and (4) at least one processor that executes the monitoring module, the determination module, and the regulation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) monitor, over a period of time, at least one performance measurement of a hybrid storage system that includes first and second types of storage devices that handle I/O throughput in connection with at least one application, (2) determine, based at least in part on the monitored performance measurement, an approximate amount of the I/O throughput handled by the first type of storage device relative to the second type of storage device over the period of time, (3) determine, based at least in part on the approximate amount of I/O throughput handled by the first type of storage device relative to the second type of storage device, a rate at which the application is allowed to deliver subsequent I/O throughput to the hybrid storage system over a subsequent period of time, and then (4) regulate, based at least in part on the rate at which the application is allowed to deliver the subsequent I/O throughput to the hybrid storage system, the subsequent I/O throughput in connection with the application over the subsequent period of time.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is an illustration of exemplary information about an I/O throughput cycle.

FIG. 6 is an illustration of exemplary information about an I/O throughput cycle.

FIG. 7 is an illustration of exemplary information about an I/O throughput cycle.

Figure 1:
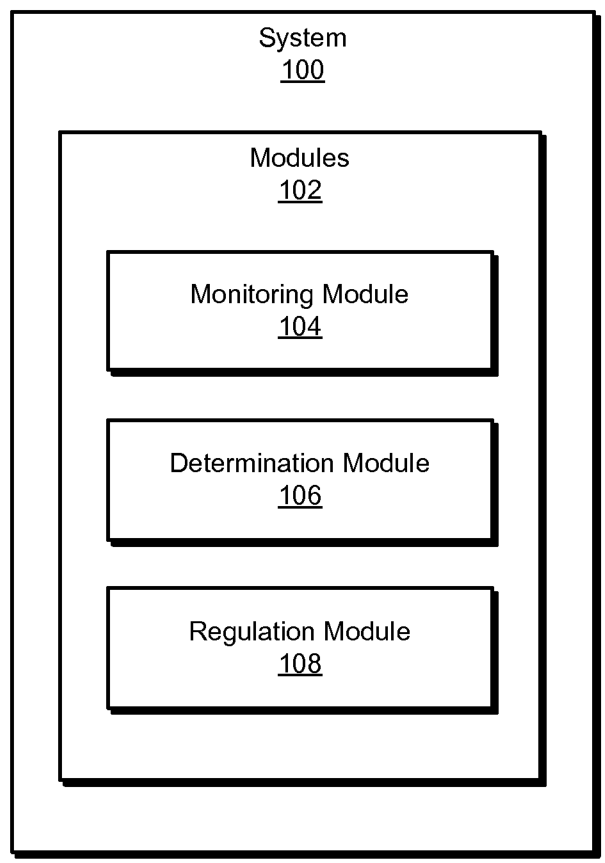
FIG. 1 is a block diagram of an exemplary system for improving quality of service within hybrid storage systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for improving quality of service within hybrid storage systems. As will be explained in greater detail below, by monitoring an I/O throughput cycle over a period of time, the various systems and methods described herein may determine how many I/O operations were serviced by different types of storage devices within a hybrid storage system during that period of time. Upon determining how many I/O operations were serviced by the different types of storage devices in this way, the systems and methods described herein may use that number of I/O operations as a reference and/or historical metric for determining substantially stable delivery rates for I/O operations originating from applications (such as VMs) over a subsequent period of time.

Moreover, by determining substantially stable delivery rates for I/O operations originating from such applications in this way, the systems and methods described herein may be able to prevent the hybrid storage system from demonstrating and/or exhibiting periods of highly fluctuating latency and/or latency swings. Additionally or alternatively, the systems and methods described herein may be able to prevent the hybrid storage system from misappropriating certain resources. For example, the systems and methods described herein may enable the hybrid storage system to avoid priority inversion with respect to certain resources (such as I/O Per Second (IOPS), computing power, and/or bandwidth).

Figure 2:
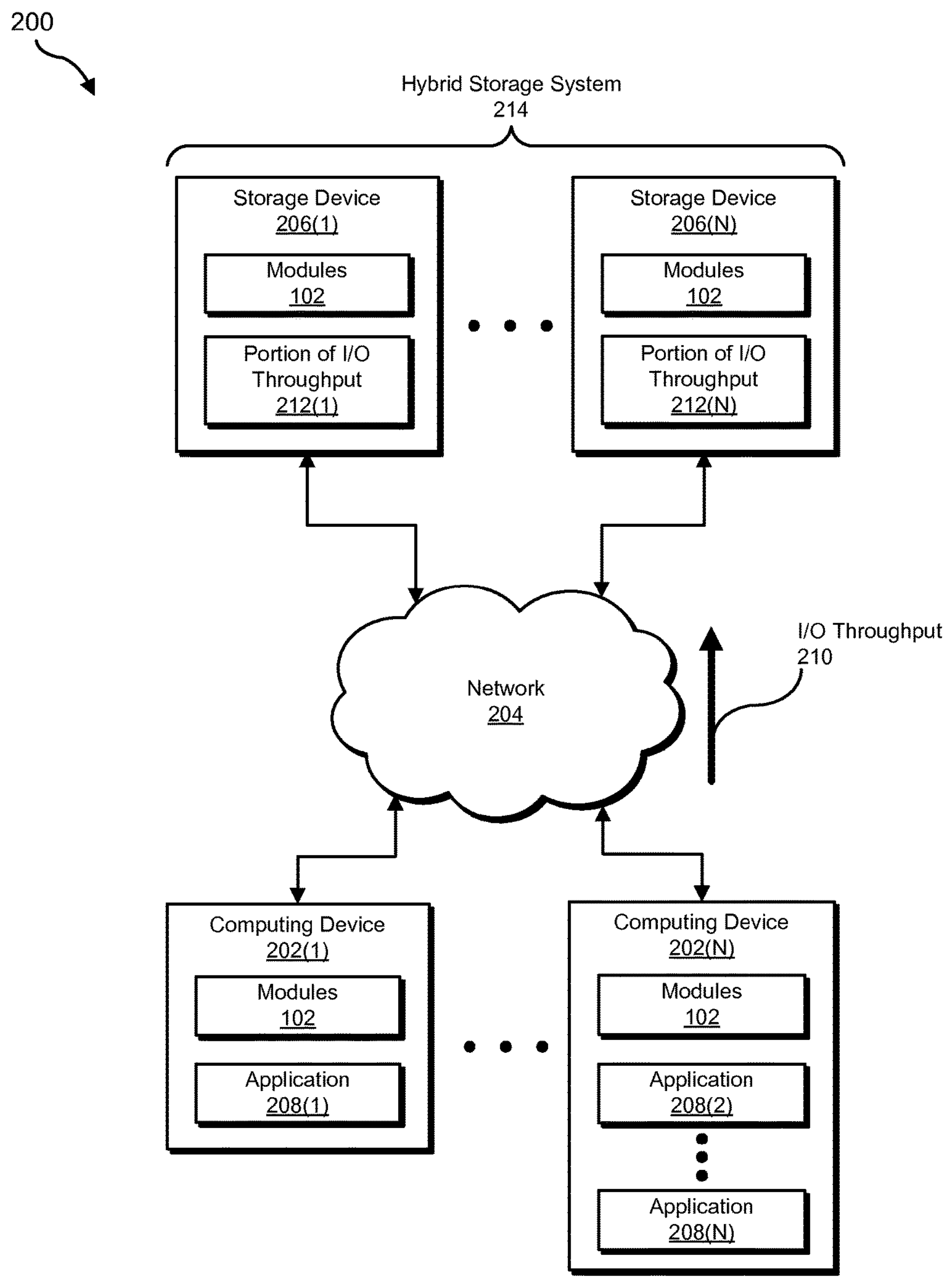
FIG. 2 is a block diagram of an additional exemplary system for improving quality of service within hybrid storage systems.
Figure 3:
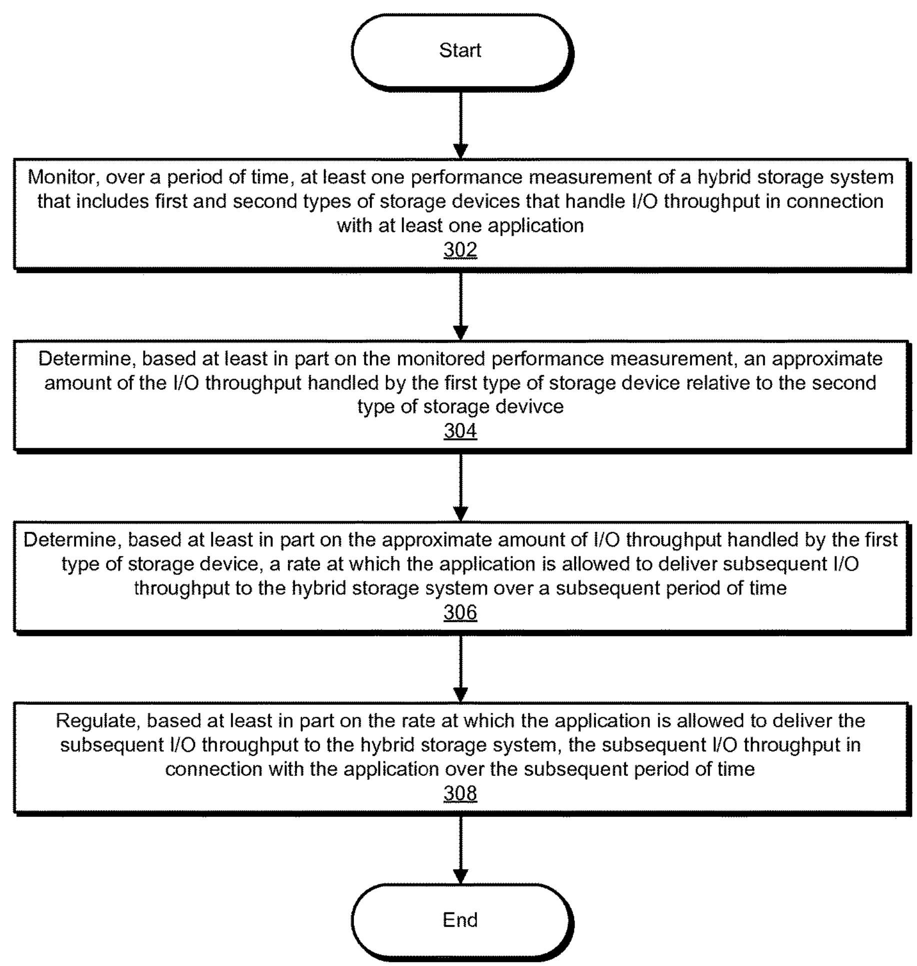
FIG. 3 is a flow diagram of an exemplary method for improving quality of service within hybrid storage systems.
Figure 4:
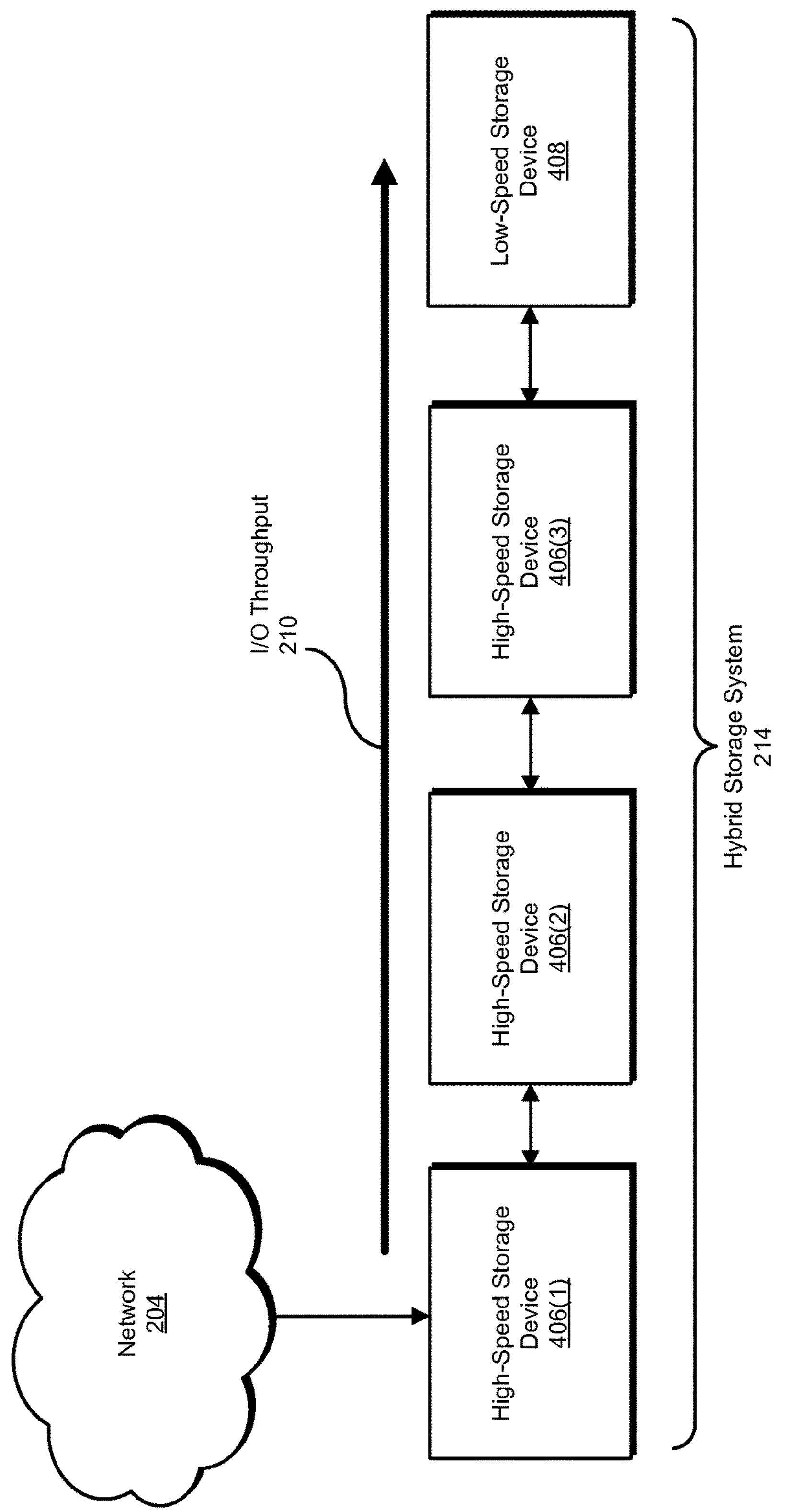
FIG. 4 is a block diagram of an additional exemplary system for improving quality of service within hybrid storage systems.

The following will provide, with reference to FIGS. 1, 2, and 4, detailed descriptions of exemplary systems for improving quality of service within hybrid storage systems. Detailed descriptions of corresponding computer-implemented methods will be provided in connection with FIG. 3. Detailed descriptions of exemplary information about I/O throughput cycles will be provided in connection with FIG. 5-7. In addition, detailed descriptions of an exemplary computing system and network architecture capable of implementing one or more of the embodiments described herein will be provided in connection with FIGS. 8 and 9, respectively.

FIG. 1 is a block diagram of an exemplary system 100 for improving quality of service within hybrid storage systems. As illustrated in this figure, exemplary system 100 may include one or more modules 102 for performing one or more tasks. For example, and as will be explained in greater detail below, exemplary system 100 may include a monitoring module 104 that monitors at least one performance measurement of a hybrid storage system that handles I/O throughput in connection with at least one application. Exemplary system 100 may also include a determination module 106 that determines, based at least in part on the monitored performance measurement, an approximate amount of the I/O throughput handled by the first type of storage device relative to the second type of storage device over the period of time. Determination module 106 may further determine, based at least in part on the approximate amount of I/O throughput handled by the first type of storage device relative to the second type of storage device, a rate at which the application is allowed to deliver subsequent I/O throughput to the hybrid storage system over a subsequent period of time.

In addition, and as will be described in greater detail below, exemplary system 100 may include a regulation module 108 that regulates, based at least in part on the rate at which the application is allowed to deliver the subsequent I/O throughput to the hybrid storage system, the subsequent I/O throughput in connection with the application over the subsequent period of time. Although illustrated as separate elements, one or more of modules 102 in FIG. 1 may represent portions of a single module or application (such as a QoS application and/or QoS feature).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N) and/or storage devices 206(1)-(N)), computing system 810 in FIG. 8, and/or portions of exemplary network architecture 900 in FIG. 9. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include one or more computing devices 202(1)-(N) in communication with a hybrid storage system 214 via a network 204. In this example, hybrid storage system 214 may include one or more storage devices 206(1)-(N) of different types and/or speeds. For example, storage device 206(1) may include and/or represent a relatively high-speed storage device such as a Solid-State Drive (SSD), disk controller cache, a file system cache, a volume manager cache, and/or a Redundant Array of Independent Disks (RAID) controller cache. Additionally or alternatively, storage device 206(N) may include and/or represent a relatively low-speed storage device such as a RAID and/or a Hard Disk Drive (HDD).

In one example, one or more of computing devices 202(1)-(N) may be programmed with one or more of modules 102. Additionally or alternatively, one or more of storage devices 206(1)-(N) may be programmed with one or more of modules 102.

In one example, one or more of computing devices 202(1)-(N) may execute and/or launch one or more applications 208(1)-(N). For example, computing device 202(1) may execute and/or launch application 208(1). Additionally or alternatively, computing device 202(N) may execute and/or launch applications 208(2)-(N).

In one example, one or more of applications 208(1)-(N) may generate and/or initiate I/O throughput 210 and then send and/or deliver the same to one or more of storage devices 206(1)-(N) via network 204. In this example, one or more of storage devices 206(1)-(N) may receive and/or obtain I/O throughput 210 and then handle, service, perform, and/or process I/O throughput 210 in connection with the corresponding applications. For example, storage device 206(1) may handle, service, perform, and/or process portion 212(1) of I/O throughput 210. In contrast, storage device 206(N) may handle, service, perform, and/or process portion 212(N) of I/O throughput 210.

In one embodiment, one or more of modules 102 from FIG. 1 may, when executed by at least one processor of computing devices 202(1)-(N) and/or storage devices 206(1)-(N), enable at least one of computing devices 202(1)-(N) and/or storage devices 206(1)-(N) to improve QoS within hybrid storage systems. For example, and as will be described in greater detail below, one or more of modules 102 may cause at least one of computing devices 202(1)-(N) and/or storage devices 206(1)-(N) to (1) monitor, over a period of time, at least one performance measurement of hybrid storage system 214 that includes storage devices 206(1)-(N) of different types that handle I/O throughput 210 in connection with one or more of applications 208(1)-(N), (2) determine, based at least in part on the monitored performance measurement, an approximate amount of I/O throughput 210 handled by storage device 206(1) as opposed to storage device 206(N) over the period of time, (3) determine, based at least in part on the approximate amount of I/O throughput 210 handled by storage device 206(1) as opposed to storage device 206(N), a rate at which the corresponding applications are allowed to deliver subsequent I/O throughput to hybrid storage system 214 over a subsequent period of time, and then (4) regulate, based at least in part on the rate at which the corresponding applications are allowed to deliver the subsequent I/O throughput to hybrid storage system 214, the subsequent I/O throughput in connection with the corresponding applications over the subsequent period of time.

Computing devices 202(1)-(N) each generally represent any type or form of computing device capable of reading computer-executable instructions. Examples of computing devices 202(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations of one or more of the same, combinations of one or more of the same, exemplary computing system 810 in FIG. 8, or any other suitable computing devices.

Hybrid storage system 214 generally represents any type or form of storage system and/or environment that includes storage devices of different types and/or speeds. In one example, hybrid storage system 214 may include storage devices 206(1)-(N) that collectively operate as a tiered storage system. In this example, storage devices 206(1)-(N) may include and/or represent any combination of high-speed storage devices (such as SSDs, disk controller caches, file system caches, volume manager caches, and/or RAID controller caches) and low-speed storage devices (such as RAIDs and/or HDDs). As illustrated in FIG. 2, hybrid storage system 214 may reside and/or sit behind network 204. Alternatively, although illustrated as residing and/or sitting behind network 204 in FIG. 2, hybrid storage device 214 may reside and/or sit within network 204 and/or represent local storage integrated into network 204.

Storage devices 206(1)-(N) each generally represent any type or form of apparatus and/or mechanism capable of storing data used by applications and/or servicing I/O throughput in connection with such applications. Examples of storage devices 206(1)-(N) include, without limitation, SSDs, disk controller caches, file system caches, volume manager caches, RAID controller caches, RAIDs, HDDs, virtual disks, variations of one or more of the same, combinations of one or more of the same, exemplary computing system 810 in FIG. 8, or any other suitable storage devices.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 900 in FIG. 9, or the like. Network 204 may facilitate communication or data transfer using wireless or wired connections. In one embodiment, network 204 may facilitate communication among computing devices 202(1)-(N) and/or storage devices 206(1)-(N). Although computing devices 202(1)-(N), storage devices 206(1)-(N), and network 204 are illustrated as separate entities in FIG. 2, one or more of computing devices 202(1)-(N) and/or storage devices 206(1)-(N) may alternatively include and/or represent portions of network 204.

Applications 208(1)-(N) generally represent any type or form of software, application, and/or program capable of running in a physical and/or virtual computing environment. In some examples, applications 208(1)-(N) may generate and/or send I/O throughput 210 to upload, download, store, and/or access data within storage devices 206(1)-(N). Examples of applications 208(1)-(N) include, without limitation, VMs, virtual storage appliances, flows, software modules and/or programs running within one or more of the same, variations of one or more of the same, combinations of one or more of the same, or any other suitable applications.

I/O throughput 210 generally represents any type or form of data transfer, data access, and/or data manipulation initiated by an application and/or serviced by a hybrid storage system. In one example, I/O throughput 210 may include and/or represent various I/O operations initiated by one or more of applications 208(1)-(N) to read, write, store, access, and/or manipulate data within hybrid storage system 214 over a certain period of time and/or during a particular I/O cycle. In this example, I/O throughput 210 may include and/or represent the number of I/O operations performed and/or processed by hybrid storage system 214 in connection with one or more of applications 208(1)-(N) over a certain period of time and/or during a particular I/O cycle.

FIG. 3 is a flow diagram of an exemplary computer-implemented method 300 for improving quality of service within hybrid storage systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 810 in FIG. 8, and/or portions of exemplary network architecture 900 in FIG. 9.

As illustrated in FIG. 3, at step 302 one or more of the systems described herein may monitor, over a period of time, at least one performance measurement of a hybrid storage system that handles I/O throughput in connection with at least one application. For example, monitoring module 104 may, as part of computing device 202 in FIG. 2, monitor at least one performance measurement of hybrid storage system 214 over a period of time. In this example, hybrid storage system 214 may handle, service, perform, and/or process I/O throughput 210 in connection with one or more of applications 208(1)-(N) over that period of time.

The term "performance measurement," as used herein with reference to a hybrid storage system, generally refers to any type or form measurement, statistic, and/or metric suggestive and/or indicative of the hybrid storage system's performance. Examples of such performance measurements include, without limitation, the number of IOPS that arrive at a hybrid storage system, the number of IOPS serviced by a hybrid storage system, the amount of latency exhibited by a hybrid storage system, the amount of I/O throughput delivered to a hybrid storage system, variations of one or more of the same, combinations of one or more of the same, or any other suitable performance measurements.

The systems described herein may perform step 302 in a variety of ways and/or contexts. In some examples, monitoring module 104 may monitor the performance measurement of hybrid storage system 214 by identifying the specific storage device that handles certain portions of I/O throughput 210. For example, monitoring module 104 may know and/or determine that storage device 206(1) services portion 212(1) of I/O throughput 210 and/or storage device 206(N) services portion 212(N) of I/O throughput 210. Accordingly, monitoring module 104 may be able to identify storage device 206(1) as having serviced portion 212(1) of I/O throughput 210 and/or storage device 206(N) as having serviced portion 212(N) of I/O throughput 210.

Additionally or alternatively, monitoring module 104 may monitor the performance measurement of hybrid storage system 214 by deducing the type of storage device that handles certain portions of I/O throughput 210 based at least in part on the processing time of certain portions of I/O throughput 210. In one example, monitoring module 104 may deduce the type of storage device that handles certain portions of I/O throughput 210 by applying a time-based threshold. For example, monitoring module 104 may determine that each I/O operation included in and/or represented by portion 212(1) of I/O throughput 210 was processed and/or serviced in less than 1 millisecond. In this example, every I/O operation that takes less than 1 millisecond to be processed and/or serviced may correspond to a high-speed storage device (such as SSD and/or cache) within hybrid storage system 214. Accordingly, since each I/O operation included in and/or represented by portion 212(1) of I/O throughput 210 was processed and/or serviced in less than 1 millisecond, monitoring module 104 may deduce that portion 212(1) of I/O throughput 210 was processed and/or serviced by a high-speed storage device within hybrid storage device 214.

In a similar example, monitoring module 104 may determine that each I/O operation included in and/or represented by portion 212(N) of I/O throughput 210 was processed and/or serviced in more than 1 millisecond. In this example, every I/O operation that takes more than 1 millisecond to be processed and/or serviced may correspond to a low-speed storage device (such as HDD) within hybrid storage system 214. Accordingly, since each I/O operation included in and/or represented by portion 212(N) of I/O throughput 210 was processed and/or serviced in less than 1 millisecond, monitoring module 104 may deduce that portion 212(N) of I/O throughput 210 was processed and/or serviced by a low-speed storage device within hybrid storage device 214.

As a specific example, while monitoring hybrid storage system 214 in FIG. 2, monitoring module 104 may count the number of I/O operations performed on a high-speed storage device within hybrid storage system 214 over a specific period of time. For example, monitoring module 104 may count 10,000 IOPS performed on storage device 206(1) within hybrid storage system 214 during a 1-second I/O cycle. Additionally or alternatively, monitoring module 104 may count the number of I/O operations performed on a low-speed storage device within hybrid storage system 214 over the same period of time. For example, monitoring module 104 may count 200 IOPS performed on storage device 206(N) within hybrid storage system 214 over that same 1-second I/O cycle. Monitoring module 104 may reset these counts at the outset of every 1-second I/O cycle.

In some examples, monitoring module 104 may not discriminate the high-speed storage devices within hybrid storage system 214 for the purpose of counting the number of I/O operations performed on a high-speed storage device. In others words, as long as an I/O operation is processed and/or serviced by any high-speed storage device (e.g., any SSD, disk controller cache, file system cache, volume manager cache, and/or RAID controller cache), monitoring module 104 may disregard the actual type and/or identity of the high-speed storage device that processed and/or serviced the I/O operation.

As a specific example, while monitoring hybrid storage system 214 in FIG. 4, monitoring module 104 may count the number of I/O operations included in and/or represented by I/O throughput 210 that are performed on one of high-speed storage devices 406(1), 406(2), and/or 406(3) in FIG. 4 over a specific period of time. Monitoring module 104 may also count the number of I/O operations included in and/or represented by I/O throughput 210 that are performed on a low-speed storage device 408 in FIG. 4 over the specific period of time. In this example, monitoring module 104 may discriminate I/O operations performed on high-speed storage devices 406(1)-(3) from I/O operations performed on low-speed storage device 408. However, monitoring module 104 may not discriminate I/O operations performed on one of high-speed storage devices 406(1)-(3) from I/O operations performed on any other one of high-speed storage devices 406(1)-(3).

Returning to FIG. 3, at step 304 one or more of the systems described herein may determine, based at least in part on the monitored performance measurement, an approximate amount of the I/O throughput handled by the first type of storage device relative to the second type of storage device over the period of time. For example, determination module 106 may, as part of computing device 202 in FIG. 2, determine an approximate or exact amount of I/O throughput 210 handled by storage device 206(1) as opposed to storage device 206(N) over the period of time. In this example, determination module 106 may make and/or arrive at this determination based at least in part on the monitored performance measurement.

The systems described herein may perform step 304 in a variety of ways and/or contexts. In some examples, determination module 106 may determine that a certain number of I/O operations were serviced and/or processed by a certain type of storage device within hybrid storage system 214. For example, determination module 106 may determine that approximately 50% of the I/O operations included in and/or represented by I/O throughput 210 were serviced and/or processed by a high-speed storage device and/or a low-speed storage device within hybrid storage system 214. In other words, the cache utilization of I/O throughput 210 was approximately 50% (meaning that 50% of I/O throughput 210 were cache or SSD hits). The term "cache utilization," as used herein, generally refers to any amount of I/O throughput handled, processed, and/or serviced by a high-speed storage device as opposed to a low-speed storage device within a hybrid storage system.

In another example, determination module 106 may determine that approximately 100% of the I/O operations included in and/or represented by I/O throughput 210 were serviced and/or processed by a high-speed storage device or a low-speed storage device within hybrid storage system 214. Alternatively, determination module 106 may determine that approximately 0% of the I/O operations included in and/or represented by I/O throughput 210 were serviced and/or processed by a high-speed storage device or a low-speed storage device within hybrid storage system 214.

In some examples, determination module 106 may determine I/O throughput 210 as a function of response latency demonstrated and/or exhibited by hybrid storage system 214 during the period of time. In such examples, I/O throughput 210 may include and/or represent the total capacity of hybrid storage system 214 during the period of time. In one example, I/O throughput 210 may be represented and formatted as an exponentially moving average that is able to absorb certain anomalies and/or variances that arise within hybrid storage system 214 due at least in part to workload specific characteristics.

Additionally or alternatively, determination module 106 may calculate, re-calculate, and/or modify an exponentially moving average using I/O throughput 210. By calculating, re-calculating, and/or modifying an exponentially moving average in this way, determination module 106 may ensure that certain anomalies and/or variances in I/O throughput do not skew the calculation beyond the point of usefulness.

As a specific example, determination module 106 may determine that I/O throughput 210 includes and/or represents approximately 10200 IOPS originating from one or more of applications 208(1)-(N). In this example, determination module 106 may determine that 10000 IOPS were monitored as having been performed on storage device 206(1) within hybrid storage system 214 during a 1-second I/O cycle. Determination module 106 may also determine that 200 IOPS were monitored as having been performed on storage device 206(N) within hybrid storage system 214 during that same 1-second I/O cycle. Additionally or alternatively, determination module 106 may determine and/or assume that 50% of the IOPS were performed by storage device 206(1) and the other 50% of the IOPS were performed by storage device 206(N) during that 1-second I/O cycle.

In addition, determination module 106 may calculate, re-calculate, and/or modify an exponentially moving average using the specific amount of I/O throughput performed on hybrid storage system 214 during that 1-second I/O cycle. In one example, example, the formula for calculating the pertinent exponentially moving average may be represented as: $\text{Capacity}_{Total}=\text{Hits}_{High\ Speed}\times\text{Capacity}_{High\ Speed}+\text{Hits}_{Low\ Speed}\times\text{Capacity}_{Low\ Speed}$. In this example, "$\text{Capacity}_{Total}$" may represent the total capacity of hybrid storage system 214, "$\text{Hits}_{High\ Speed}$" may represent the percentage of IOPS performed by a high-speed storage device within hybrid storage system 214, "$\text{Capacity}_{High\ Speed}$" may represent the respective capacity of the low-speed storage devices within hybrid storage system 214, "$\text{Hits}_{Low\ Speed}$" may represent the percentage of IOPS performed by a low-speed storage device within hybrid storage system 214, and "$\text{Capacity}_{Low\ Speed}$" may represent the respective capacity of the low-speed storage devices within hybrid storage system 214. For example, by applying the above statistics to this formula, determination module 106 may determine that: $\text{Capacity}_{Total}=50\%\times10000+50\%\times200=5{,}100$ IOPS.

By using an exponentially moving average in this way, determination module 106 may be able to make QoS decisions that reflect the workload trend of hybrid storage system 214, as opposed to rapid changes in the workload. In other words, this exponentially moving average may, in large part, follow the workload trend and/or absorb rapid workload changes, thereby enabling determination module 106 to make stable QoS decisions based at least in part on this exponentially moving average and despite certain anomalies and/or variances in the workload.

Returning to FIG. 3, at step 306 one or more of the systems described herein may determine, based at least in part on the approximate amount of I/O throughput handled by the first type of storage device, a rate at which the application is allowed to deliver subsequent I/O throughput over a subsequent period of time. For example, determination module 106 may, as part of computing device 202 in FIG. 2, determine a rate at which one or more of applications 208(1)-(N) are allowed to deliver subsequent I/O throughput (not necessarily illustrated in FIG. 2) over a subsequent period of time. The term "rate," as used herein, generally refers to any degree of speed and/or frequency at which an application sends and/or delivers I/O operations or any maximum amount of I/O throughput that the application is allowed to send or deliver to a hybrid storage system over a period of time.

In one example, the rate may represent and/or correspond to an average speed or frequency at which application 208(1) is allowed to send and/or deliver I/O throughput to hybrid storage system 214 over the subsequent period of time. Additionally or alternatively, the rate may represent and/or correspond to a maximum amount of I/O throughput that application 208(1) is allowed to send and/or deliver to hybrid storage system 214 over the subsequent period of time.

The systems described herein may perform step 306 in a variety of ways and/or contexts. In some examples, determination module 106 may determine the delivery rate for subsequent I/O operations originating from one or more of applications 208(1)-(N) during the subsequent period of time based at least in part on the percentage of I/O throughput 210 serviced by a high-speed storage device and/or a low-speed storage device during the previous period of time. For example, determination module 106 may factor the percentage of I/O throughput 210 serviced by a high-speed storage device into a formula used to calculate the rate at which application 208(1) is allowed to deliver subsequent I/O throughput to hybrid storage system 214 during the next 1-second I/O cycle.

Additionally or alternatively, determination module 106 may identify a priority level of application 208(1) relative to applications 208(2)-(N). Determination module 106 may then determine the rate at which application 208(1) is allowed to deliver subsequent I/O throughput to hybrid storage system 214 during the subsequent period of time based at least in part on the approximate amount of I/O throughput 210 serviced by a high-speed storage device and the priority level of application 208(1) relative to applications 208(2)-(N). For example, determination module 106 may factor the approximate amount of I/O throughput 210 serviced by a high-speed storage device and the priority level of application 208(1) into a formula used to calculate the rate at which application 208(1) is allowed to deliver the subsequent I/O throughput to hybrid storage system 214 during the next 1-second I/O cycle. In this example, determination module 106 may scale applications 208(1)-(N) based on their priority levels by applying a weight representative of the corresponding priority level to each of applications 208(1)-(N).

In one example, determination module 106 may determine the delivery rate for subsequent I/O operations originating from one or more of applications 208(1)-(N) during the subsequent period of time based at least in part on I/O credits allotted to applications 208(1)-(N) for that subsequent period of time. For example, determination module 106 may allot a certain number of I/O credits corresponding to an approximate or exact amount of I/O operations that application 208(1) is allowed to contribute to the subsequent I/O throughput during the next 1-second I/O cycle. The term "I/O credit" or simply "credit," as used herein, generally refers to any representation of a portion of I/O processing power, bandwidth, and/or workload allotted and/or credited to an application with respect to a hybrid storage system.

As a specific example, determination module 106 may calculate the number of I/O credits to allot to applications 208(1)-(N) based at least in part on the information about I/O cycle 500 in FIG. 5. As illustrated in FIG. 5, information about I/O cycle 500 may identify the duration of an I/O cycle (in this example, "1 second"), all of the applications contributing to I/O throughput (in this example, "VM1," "VM2," "VM3," and "VM4"), priority levels of those applications (in this example, "4 (VM4)→Highest Priority," "3 (VM3)," "2 (VM2)," and "1 (VM1)→Lowest Priority"), the total cache utilization of those applications (in this example, "100"), the individual cache utilization of each application within those applications (in this example, "10 (VM4)," "20 (VM3)," "30 (VM2)," and "40 (VM1)"), the percentage of cache utilization specified by a user (in this example, "100%"), and the total capacity of hybrid storage system 214 during the I/O cycle (in this example, "200 IOPS"). In one example, the total cache utilization and/or the individual cache utilizations may be represented and formatted as an exponentially moving average that is able to absorb certain anomalies and/or variances that arise within hybrid storage system 214 due at least in part to workload specific characteristics.

Determination module 106 may determine a scaling factor for the priority levels of the applications by setting the summation of the product of the priority levels and the scaling factor equal to the total cache utilization. In one example, the formula for determining the scaling factor for the priority levels of the applications may be represented as: Cache $\text{Utilization}_{Total}=\Sigma_{i=1}^{N}$ (Priority $\text{Level}_{Application\ (i)}\times$ Scaling Factor). In this example, "Cache $\text{Utilization}_{Total}$" may represent the total number of I/O operations originating from applications 208(1)-(N) that resulted in cache and/or SSD hits during the previous I/O cycle, "Priority $\text{Level}_{Application\ (i)}$" may represent the priority levels assigned to applications 208(1)-(N), and "Scaling Factor" may represent any number or formula used to scale and/or weight applications 208(1)-(N) based on their assigned priority levels. For example, by applying information about I/O cycle 500 in FIG. 5 to this formula, determination module 106 may determine that: 100=1y+2y+3y+4y=10y and/or y=10 (where "y" represents the scaling factor). In one example, "Cache $\text{Utilization}_{Total}$" may be represented and formatted as an exponentially moving average that covers all of applications 208(1)-(N) and is able to absorb certain anomalies and/or variances that arise within hybrid storage system 214 due at least in part to workload specific characteristics.

Moreover, determination module 106 may scale the priority levels of the applications by multiplying the priority levels of the applications by the scaling factor. In one example, the formula for scaling the priority weights for each of the applications may be represented as: Scaled Priority $\text{Weight}_{Application}$=Priority $\text{Level}_{Application}\times$Scaling Factor. In this example, "Scaled Priority $\text{Weight}_{Application}$" may represent a scaled priority weight applied to a particular application within applications 208(1)-(N) based on the application's assigned priority level, "Priority $\text{Level}_{Application}$" may represent the priority level assigned to a particular application within applications 208(1)-(N), and "Scaling Factor" may represent any number or formula used to scale and/or weight applications 208(1)-(N) based on their assigned priority levels. For example, by applying information about I/O cycle 500 in FIG. 5 to this formula, determination module 106 may determine that: Scaled Priority $\text{Weight}_{VM1}=1\times10=10$, Scaled Priority $\text{Weight}_{VM2}=2\times10=20$, Scaled Priority $\text{Weight}_{VM3}=3\times10=30$, and/or Scaled Priority $\text{Weight}_{VM4}=4\times10=40$.

Additionally or alternatively, determination module 106 may calculate the number of I/O credits to allot to each application by multiplying the total capacity of hybrid storage system 214 and the sum of that application's scaled priority weight and cache utilization relative to the sum of all of the scaled priority weights and the total cache utilization. In one example, the formula for calculating the number of I/O credits may be represented as:

$$\text{Credits}_{Application}=\frac{\text{Capacity}_{Total}\times(\text{Scaled Priority Weight}_{Application}+\text{Cache Utilization}_{Application}\times\text{User-specified Percentage of Cache})}{\text{Scaled Priority Weight}_{Total}+\text{Cache Utilization}_{Total}\times\text{User-specified Percentage of Cache}}.$$

In this example, "$\text{Credits}_{Application}$" may represent the number of credits (or IOPS) allotted to a particular application within applications 208(1)-(N) for the next I/O cycle, "$\text{Capacity}_{Total}$" may represent the total capacity of hybrid storage system 214, "Scaled Priority $\text{Weight}_{Application}$" may represent a scaled priority weight applied to a particular application within applications 208(1)-(N) based on the application's assigned priority level, "Cache $\text{Utilization}_{Application}$" may represent the number of I/O operations originating from a particular application that resulted in cache and/or SSD hits during the previous I/O cycle, "User-specified Percentage of Cache" may represent a percentage of cache utilization (whether the total cache utilization or the individual cache utilizations) selected by a user for the next I/O cycle, "Scaled Priority $\text{Weight}_{Total}$" may represent the total amount of scaled priority weights applied to applications 208(1)-(N), "Cache $\text{Utilization}_{Total}$" may represent the total number of I/O operations originating from applications 208(1)-(N) that resulted in cache and/or SSD hits during the previous I/O cycle. For example, by applying information about I/O cycle 500 in FIG. 5 to this formula, determination module 106 may determine that:

$$\text{Credits}_{VM1}=\frac{200\times(10+40\times100\%)}{100+100\times100\%}=50,$$

$$\text{Credits}_{VM2}=\frac{200\times(20+30\times100\%)}{100+100\times100\%}=50,$$

$$\text{Credits}_{VM3}=\frac{200\times(30+20\times100\%)}{100+100\times100\%}=50,\text{ and/or}$$

$$\text{Credits}_{VM4}=\frac{200\times(40+10\times100\%)}{100+100\times100\%}=50.$$

In one example, "Cache $\text{Utilization}_{Application}$" may be represented and formatted as an exponentially moving average that is specific to the application and able to absorb certain anomalies and/or variances that arise within hybrid storage system 214 due at least in part to workload specific characteristics.

Determination module 106 may then calculate the rates at which applications 208(1)-(N) are allowed to deliver the subsequent I/O throughput to hybrid storage system 214 during the next 1-second I/O cycle. In this example, the formula for calculating the rate may be represented as:

$$\text{Average Rate}_{Application}=\frac{\text{Credits}_{Application}}{\text{Time}_{I/O\ Cycle}}.$$

For example, by applying information about I/O cycle 500 in FIG. 5 to this formula, determination module 106 may determine that:

$$\text{Average Rate}_{VM1}=\frac{50\ IOPS}{1\text{ second}}=50\text{ Hertz},$$

$$\text{Average Rate}_{VM2}=\frac{50\ IOPS}{1\text{ second}}=50\text{ Hertz},$$

$$\text{Average Rate}_{VM3}=\frac{50\ IOPS}{1\text{ second}}=50\text{ Hertz, and/or}$$

$$\text{Average Rate}_{VM4}=\frac{50\ IOPS}{1\text{ second}}=50\text{ Hertz}.$$

As another specific example, determination module 106 may calculate the number of I/O credits to allot to applications 208(1)-(N) based at least in part on the information about I/O cycle 600 in FIG. 6. As illustrated in FIG. 6, information about I/O cycle 600 may identify the duration of an I/O cycle (in this example, "1 second"), all of the applications contributing to I/O throughput (in this example, "VM1," "VM2," "VM3," "VM4," and "VM5"), priority levels of those applications (in this example, "4 (VM5)→Highest Priority," "3 (VM3)," "2 (VM2)," "2 (VM2)," and "1 (VM1)→Lowest Priority"), the total cache utilization of those applications (in this example, "29000"), the individual cache utilization of each application within those applications (in this example, "4000 (VM5)," "8000 (VM4)," "5000 (VM3)," "2000 (VM2)," and "10000 (VM1)"), the percentage of cache utilization specified by a user (in this example, "100%"), and the total capacity of hybrid storage system 214 during the I/O cycle (in this example, "40000 IOPS").

In this example, by applying information about I/O cycle 600 in FIG. 6 to Cache Utilization$_{Total}$=$\Sigma_{i=1}^{N}$(Priority Level$_{Application\ (i)}$×Scaling Factor), determination module 106 may determine that: 29000=1y+2y+2y+3y+4y=12y and/or y~2416 (where "y" represents the scaling factor). In addition, by applying information about I/O cycle 600 in FIG. 6 to Scaled Priority Weight$_{Application}$=Priority Level$_{Application}$×Scaling Factor, determination module 106 may determine that: Scaled Priority Weight$_{VM1}$=1×2416=2416, Scaled Priority Weight$_{VM2}$=2×2416=4832, Scaled Priority Weight$_{VM3}$=2×2416=4832, Scaled Priority Weight$_{VM4}$=3×2416=7248, and/or Scaled Priority Weight$_{VM5}$=4×2416=9664. Moreover, by applying information about I/O cycle 600 in FIG. 6 to $$\text{Credits}_{Application} = \frac{\text{Capacity}_{Total} \times (\text{Scaled Priority Weight}_{Application} + \text{Cache Utilization}_{Application} \times \text{User-specified Percentage of Cache})}{\text{Scaled Priority Weight}_{Total} + \text{Cache Utilization}_{Total} \times \text{User-specified Percentage of Cache}},$$

determination module 106 may determine that:

$$\text{Credits}_{VM1} = \frac{40000 \times (2416 + 10000 \times 100\%)}{28992 + 29000 \times 100\%} \sim 8564,$$

$$\text{Credits}_{VM2} = \frac{40000 \times (4832 + 2000 \times 100\%)}{28992 + 29000 \times 100\%} \sim 4712,$$

$$\text{Credits}_{VM3} = \frac{40000 \times (4832 + 5000 \times 100\%)}{28992 + 29000 \times 100\%} \sim 6782,$$

$$\text{Credits}_{VM4} = \frac{40000 \times (7248 + 8000 \times 100\%)}{28992 + 29000 \times 100\%} \sim 10518, \text{ and/or}$$

$$\text{Credits}_{VM5} = \frac{40000 \times (9664 + 4000 \times 100\%)}{28992 + 29000 \times 100\%} \sim 9424.$$

Determination module 106 may then calculate the rates at which applications 208(1)-(N) are allowed to deliver the subsequent I/O throughput to hybrid storage system 214 during the next 1-second I/O cycle. For example, by applying information about I/O cycle 600 in FIG. 6 to $$\text{Average Rate}_{Application} = \frac{\text{Credits}_{Application}}{\text{Time}_{I/O\ Cycle}},$$

determination module 106 may determine that:

$$\text{Average Rate}_{VM1} = \frac{8563\ IOPS}{1\ \text{second}} = 8563 \text{ Hertz},$$

$$\text{Average Rate}_{VM2} = \frac{4712\ IOPS}{1\ \text{second}} = 4712 \text{ Hertz},$$

$$\text{Average Rate}_{VM3} = \frac{6782\ IOPS}{1\ \text{second}} = 6782 \text{ Hertz},$$

$$\text{Average Rate}_{VM4} = \frac{10518\ IOPS}{1\ \text{second}} = 10518 \text{ Hertz, and/or}$$

$$\text{Average Rate}_{VM5} = \frac{9424\ IOPS}{1\ \text{second}} = 9424 \text{ Hertz}.$$

As a further specific example, determination module 106 may calculate the number of I/O credits to allot to applications 208(1)-(N) based at least in part on the information about I/O cycle 700 in FIG. 7. As illustrated in FIG. 7, information about I/O cycle 700 may identify the duration of an I/O cycle (in this example, "1 second"), all of the applications contributing to I/O throughput (in this example, "VM1," "VM2," "VM3," "VM4," and "VM5"), priority levels of those applications (in this example, "4 (VM5)→Highest Priority," "3 (VM3)," "2 (VM2)," "2 (VM2)," and "1 (VM1)→Lowest Priority"), the total cache utilization of those applications (in this example, "29000"), the individual cache utilization of each application within those applications (in this example, "4000 (VM5)," "8000 (VM4)," "5000 (VM3)," "2000 (VM2)," and "10000 (VM1)"), the percentage of cache utilization specified by a user (in this example, "50%"), and the total capacity of hybrid storage system 214 during the I/O cycle (in this example, "40000 IOPS").

In this example, by applying information about I/O cycle 700 in FIG. 7 to Cache Utilization$_{Total}$=$\Sigma_{i=1}^{N}$(Priority Level$_{Application\ (i)}$×Scaling Factor), determination module 106 may determine that: 29000=1y+2y+2y+3y+4y=12y and/or y~2416 (where "y" represents the scaling factor). In addition, by applying information about I/O cycle 700 in FIG. 7 to Scaled Priority Weight$_{Application}$ Priority Level$_{Application}$×Scaling factor, determination module 106 may determine that: Scaled Priority Weight$_{VM1}$=1×2416=2416, Scaled Priority Weight$_{VM2}$=2×2416=4832, Scaled Priority Weight$_{VM3}$=2×2416=4832, Scaled Priority Weight$_{VM4}$=3×2416=7248, and/or Scaled Priority Weight$_{VM5}$=4×2416=9664. Moreover, by applying information about I/O cycle 700 in FIG. 7 to $$\text{Credits}_{Application} = \frac{\text{Capacity}_{Total} \times (\text{Scaled Priority Weight}_{Application} + \text{Cache Utilization}_{Application} \times \text{User-specified Percentage of Cache})}{\text{Scaled Priority Weight}_{Total} + \text{Cache Utilization}_{Total} \times \text{User-specified Percentage of Cache}},$$

determination module 106 may determine that:

$$\text{Credits}_{VM1} = \frac{40000 \times (2416 + 10000 \times 50\%)}{28992 + 29000 \times 50\%} \sim 6821,$$

$$\text{Credits}_{VM2} = \frac{40000 \times (4832 + 2000 \times 50\%)}{28992 + 29000 \times 50\%} \sim 5364,$$

$$\text{Credits}_{VM3} = \frac{40000 \times (4832 + 5000 \times 50\%)}{28992 + 29000 \times 50\%} \sim 6743,$$

-continued $$\text{Credits}_{VM4} = \frac{40000 \times (7248 + 8000 \times 50\%)}{28992 + 29000 \times 50\%} \sim 10345, \text{ and/or}$$

$$\text{Credits}_{VM5} = \frac{40000 \times (9664 + 4000 \times 50\%)}{28992 + 29000 \times 50\%} \sim 10727.$$

Determination module 106 may then calculate the rates at which applications 208(1)-(N) are allowed to deliver the subsequent I/O throughput to hybrid storage system 214 during the next 1-second I/O cycle. For example, by applying information about I/O cycle 600 in FIG. 6 to $$\text{Average Rate}_{Application} = \frac{\text{Credits}_{Application}}{\text{Time}_{I/O\ Cycle}},$$

determination module 106 may determine that:

$$\text{Average Rate}_{VM1} = \frac{6821\ IOPS}{1\ \text{second}} = 6821 \text{ Hertz},$$

$$\text{Average Rate}_{VM2} = \frac{5364\ IOPS}{1\ \text{second}} = 5364 \text{ Hertz},$$

$$\text{Average Rate}_{VM3} = \frac{6743\ IOPS}{1\ \text{second}} = 6743 \text{ Hertz},$$

$$\text{Average Rate}_{VM4} = \frac{10345\ IOPS}{1\ \text{second}} = 10345 \text{ Hertz, and/or}$$

$$\text{Average Rate}_{VM5} = \frac{10727\ IOPS}{1\ \text{second}} = 10727 \text{ Hertz}.$$

By calculating the number of I/O credits to allot to applications 208(1)-(N) in this way, determination module 106 may be able to make QoS decisions that maintain reasonably fair transfer rates and/or bandwidth shares for applications 208(1)-(N) across varying I/O cycles. Moreover, by calculating the number of I/O credits to allot to applications 208(1)-(N) in this way, determination module 106 may be able to avoid priority inversion of resources even in the unlikely event that the lowest priority application has the highest cache utilization and/or the highest priority application has the lowest cache utilization.

Returning to FIG. 3, at step 308 one or more of the systems described herein may regulate, based at least in part on the rate at which the application is allowed to deliver the subsequent I/O throughput to the hybrid storage system, the subsequent I/O throughput in connection with the application over the subsequent period of time. For example, regulation module 108 may, as part of computing device 202 in FIG. 2, regulate and/or control the subsequent I/O throughput in connection with the one or more of applications 208(1)-(N) over the subsequent period of time based at least in part on the rate.

The systems described herein may perform step 308 in a variety of ways and/or contexts. In some examples, regulation module 108 may regulate the subsequent I/O throughput by ensuring that hybrid storage system 214 does not handle beyond a certain number of I/O operations in connection with any of applications 208(1)-(N) during the subsequent period of time. For example, regulation module 108 may allot, to application 208(1), a number of I/O credits corresponding to an approximate amount of I/O operations that application 208(1) is allowed to contribute to the subsequent I/O throughput during the next 1-second I/O cycle. By allotting the number of I/O credits to application 208(1) in this way, regulation module 108 may ensure that hybrid storage system 214 does not service and/or process a number of I/O operations originating from application 208(1) in excess of the number of allotted I/O credits during the next 1-second I/O cycle.

In one example, regulation module 108 may prevent application 208(1) from delivering a number of I/O operations that exceeds the number of allotted I/O credits to hybrid storage system 214 over the next 1-second I/O cycle. Additionally or alternatively, regulation module 108 may prevent hybrid storage system 214 from performing a number of I/O operations originating from application 208(1) in excess of the number of allotted I/O credits during the next 1-second I/O cycle.

In some examples, the systems and methods described herein may repeat one or more of steps 302, 304, 306, and 308 to reevaluate the characteristics (such as I/O throughput, I/O credits, and/or delivery rates) of hybrid storage system 214 and/or applications 208(1)-(N) on a substantially continuous basis (e.g., every I/O cycle). For example, during the next 1-second I/O cycle, monitoring module 104 may monitor at least one performance measurement of hybrid storage system 214. In this example, determination module 106 may determine an approximate or exact amount of I/O throughput handled by storage device 206(1) as opposed to storage device 206(N) during the next 1-second I/O cycle. Determination module 106 may then determine, based at least in part on this amount, a rate at which one or more of applications 208(1)-(N) are allowed to deliver further I/O throughput to hybrid storage system 214 during a later 1-second I/O cycle. Finally, regulation module 108 may regulate the further I/O throughput in connection with the one or more of applications 208(1)-(N) during the later 1-second I/O cycle.

As explained above in connection with exemplary method 300 in FIG. 3, a QoS application may monitor I/O throughput of a hybrid storage system over a 1-second period of time. By monitoring the I/O throughput of the hybrid storage system in this way, the QoS application may determine how many I/O operations were serviced by SSD or cache and how many I/O operations were serviced by disk during that 1-second period of time. Upon determining how many I/O operations were serviced by these different types of storage devices in this way, the QoS application may use that number of I/O operations as a reference and/or historical metric for allotting I/O credits and/or determining substantially stable delivery rates for I/O operations originating from certain applications over the next 1-second period of time. The QoS may continue to reevaluate the I/O credits allotted to the applications during or prior to each 1-second period of time.

Figure 8:
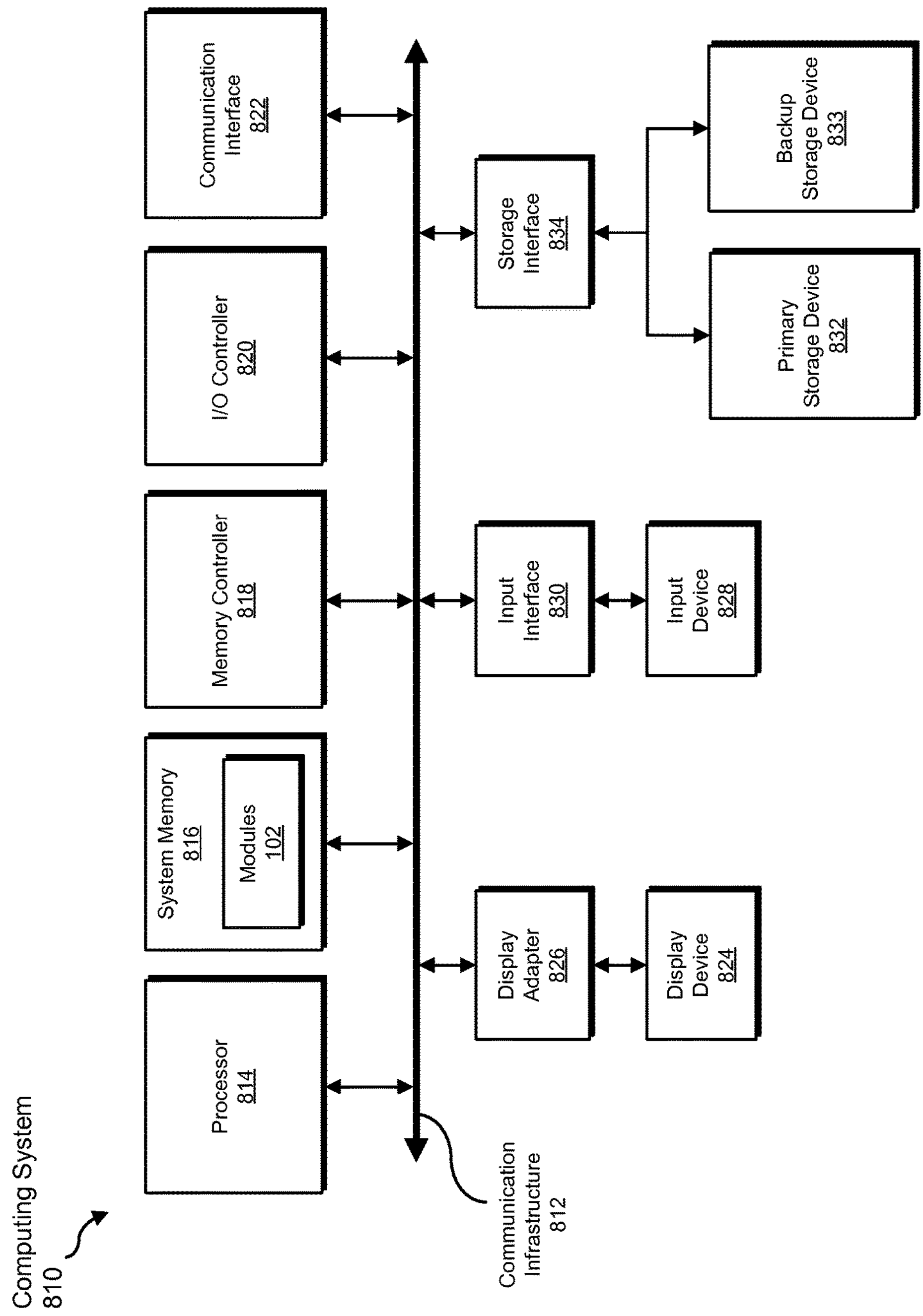
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the exemplary embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., an HDD), an SSD, a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an Application Specific Integrated Circuit (ASIC) adapted to implement one or more of the exemplary embodiments disclosed herein.

Figure 9:
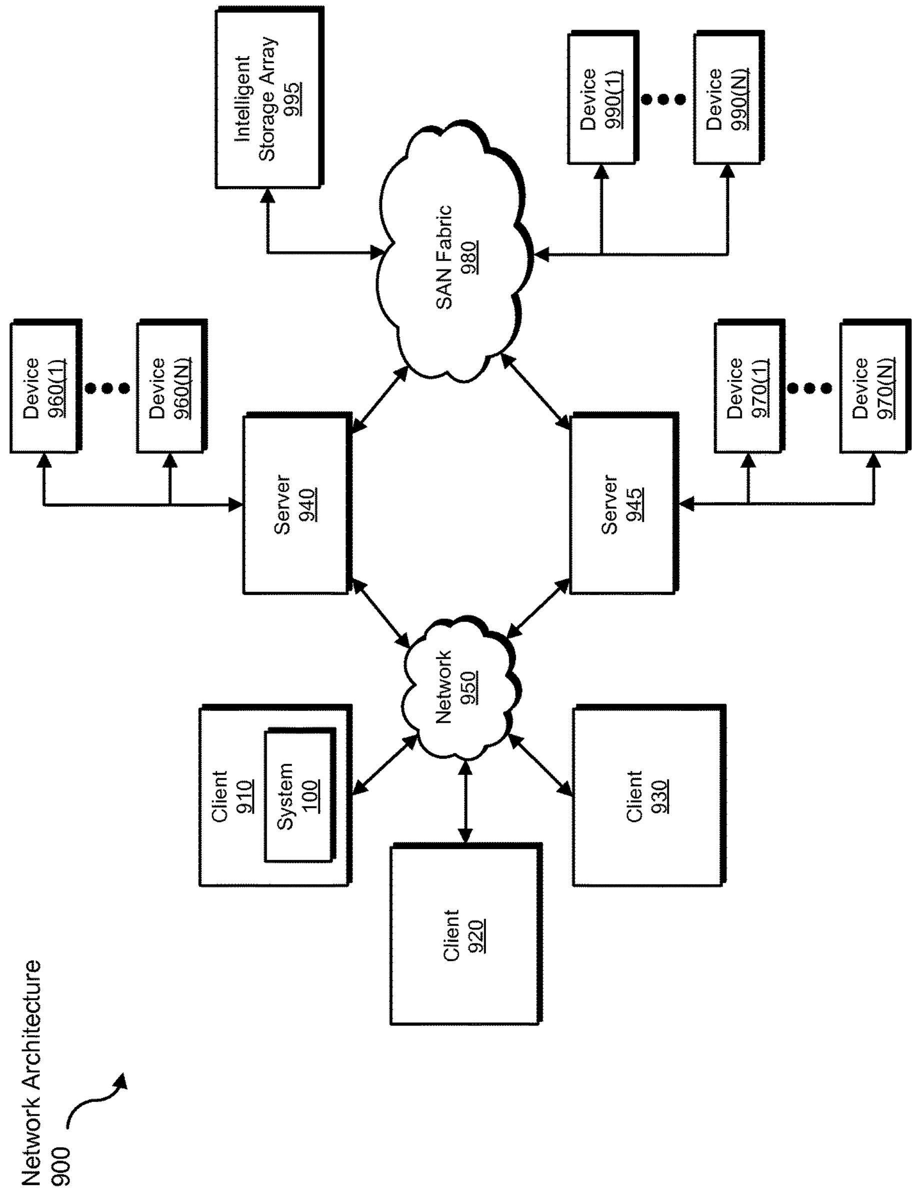
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an exemplary method for improving quality of service within hybrid storage systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive I/O throughput to be transformed, transform the I/O throughput, output a result of the transformation to determine a delivery rate for subsequent I/O throughput, use the result of the transformation to regulate the subsequent I/O throughput, and store the result of the transformation for future use. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for improving quality of service within hybrid storage systems, at least a portion of the method being performed by a computing device comprising at least one processor, the method comprising:

monitoring, during a first Input/Output (I/O) cycle, at least one performance measurement of a hybrid storage system that handles I/O operations in connection with at least one application, the hybrid storage system comprising:
a high-speed storage device; and
a low-speed storage device whose speed is slower than the high-speed storage device;

deducing, based at least in part on processing times of the I/O operations, an amount of the I/O operations handled by the high-speed storage device relative to the low-speed storage device during the first I/O cycle;

assigning a priority level to the application;

assigning another priority level to at least one other application that contributes to the I/O operations handled by the hybrid storage system during the first I/O cycle;

scaling the priority level of the application by multiplying the priority level of the application by a scaling factor;

scaling the other priority level of the other application by multiplying the other priority level of the other application by the scaling factor;

calculating a rate at which the application is allowed to deliver subsequent I/O operations to the hybrid storage system during a second I/O cycle based at least in part on:
the amount of I/O operations handled by the high-speed storage device relative to the low-speed storage device during the first I/O cycle;
an amount of I/O operations that originated from the application and were handled by the high-speed storage device during the first I/O cycle;
a user-specified percentage of the high-speed storage device;
the scaled priority level of the application;
a sum of the scaled priority level of the application and the other scaled priority level of the other application;
a total capacity of the hybrid storage system; and
a duration of the second I/O cycle; and regulating the subsequent I/O operations in connection with the application during the second I/O cycle by:
allotting the application a certain number of I/O credits corresponding to the calculated rate at which the application is allowed to deliver the subsequent I/O operations to the hybrid storage system during the second I/O cycle; and
applying the calculated rate to the application during the second I/O cycle.

2. The method of claim 1, wherein monitoring the performance measurement of the hybrid storage system comprises at least one of:
counting the number of I/O operations performed on the high-speed storage device in connection with the application during the first I/O cycle; and
counting the number of I/O operations performed on the low-speed storage device in connection with the application during the first I/O cycle.

3. The method of claim 1, wherein:
deducing the amount of I/O operations handled by the high-speed storage device relative to the low-speed storage device comprises determining a percentage of the I/O operations that was serviced by the high-speed storage device as opposed to the low-speed storage device during the first I/O cycle.

4. The method of claim 3, wherein calculating the rate at which the application is allowed to deliver the subsequent I/O operations to the hybrid storage system comprises factoring the percentage of I/O operations serviced by the high-speed storage device into a formula used to calculate the rate at which the application is allowed to deliver the subsequent I/O operations to the hybrid storage system.

5. The method of claim 3, wherein calculating the rate at which the application is allowed to deliver the subsequent I/O operations to the hybrid storage system comprises:
decreasing the rate at which the application is allowed to deliver subsequent I/O operations to the hybrid storage system during the second I/O cycle due at least in part to:
the amount of I/O operations handled by the high-speed storage device relative to the low-speed storage device; and
the priority level assigned to the application relative to the other priority level assigned to the other application.

6. The method of claim 5, wherein decreasing the rate at which the application is allowed to deliver the subsequent I/O operations to the hybrid storage system comprises factoring the amount of I/O operations handled by the high-speed storage device and the priority level assigned to the application into a formula used to calculate the rate at which the application is allowed to deliver the subsequent I/O operations to the hybrid storage system.

7. The method of claim 1, further comprising:
increasing, due at least in part to the amount of I/O operations handled by the high-speed storage device relative to the low-speed storage device, a rate at which the other application is allowed to contribute to the subsequent I/O operations delivered to the hybrid storage system during the second I/O cycle; and regulating, based at least in part on the increased rate at which the other application is allowed to contribute to the subsequent I/O operations delivered to the hybrid storage system, the subsequent I/O operations in connection with the other application during the second I/O cycle.

8. The method of claim 1, wherein regulating the subsequent I/O operations in connection with the application during the second I/O cycle comprises:

ensuring that the hybrid storage system does not handle a number of I/O operations that exceeds the number of allotted I/O credits in connection with the application during the second I/O cycle.

9. The method of claim 8, wherein ensuring that the hybrid storage system does not handle a number of I/O operations that exceeds the number of allotted I/O credits comprises at least one of:

preventing the application from delivering a number of I/O operations that exceeds the number of allotted I/O credits to the hybrid storage system during the second I/O cycle; and preventing the hybrid storage system from performing a number of I/O operations that exceeds the number of allotted I/O credits in connection with the application during the second I/O cycle.

10. The method of claim 1, wherein the application comprises at least one of:

a virtual machine; and a plurality of virtual machines.

11. A system for improving quality of service within hybrid storage systems, the system comprising:

a monitoring module, stored in memory, that:

monitors, during a first Input/Output (I/O) cycle, at least one performance measurement of a hybrid storage system that handles I/O operations in connection with at least one application, the hybrid storage system comprising:

a high-speed storage device; and a low-speed storage device whose speed is slower than the high-speed storage device;

deduces, based at least in part on processing times of the I/O operations, an amount of the I/O operations handled by the high-speed storage device relative to the low-speed storage device during the first I/O cycle;

a determination module, stored in memory, that:

assigns a priority level to the application;

assigns another priority level to at least one other application that contributes to the I/O operations handled by the hybrid storage system during the first I/O cycle;

scales the priority level of the application by multiplying the priority level of the application by a scaling factor;

scales the other priority level of the other application by multiplying the other priority level of the other application by the scaling factor; and calculates a rate at which the application is allowed to deliver subsequent I/O operations to the hybrid storage system during a second I/O cycle based at least in part on:

the amount of I/O operations handled by the high-speed storage device relative to the low-speed storage device during the first I/O cycle;

an amount of I/O operations that originated from the application and were handled by the high-speed storage device during the first I/O cycle;

a user-specified percentage of the high-speed storage device;

the scaled priority level of the application;

a sum of the scaled priority level of the application and the other scaled priority level of the other application;

a total capacity of the hybrid storage system; and a duration of the second I/O cycle;

a regulation module that regulates the subsequent I/O operations in connection with the application during the second I/O cycle by:

allotting the application a certain number of I/O credits corresponding to the calculated rate at which the application is allowed to deliver the subsequent I/O operations to the hybrid storage system during the second I/O cycle; and applying the calculated rate to the application during the second I/O cycle; and at least one physical processor that executes the monitoring module, the determination module, and the regulation module.

12. The system of claim 11, wherein the monitoring module monitors the performance measurement of the hybrid storage system by at least one of:

counting the number of I/O operations performed on the high-speed storage device in connection with the application during the first I/O cycle; and counting the number of I/O operations performed on the low-speed storage device in connection with the application during the first I/O cycle.

13. The system of claim 11, wherein:

the determination module decreases the amount of I/O operations handled by the high-speed storage device relative to the low-speed storage device comprises determining a percentage of the I/O operations that was serviced by the high-speed storage device as opposed to the low-speed storage device during the first I/O cycle.

14. The system of claim 13, wherein the determination module decreases the rate at which the application is allowed to deliver the subsequent I/O operations to the hybrid storage system by factoring the percentage of I/O operations serviced by the high-speed storage device into a formula used to calculate the rate at which the application is allowed to deliver the subsequent I/O operations to the hybrid storage system.

15. The system of claim 13, wherein the determination module calculates the rate at which the application is allowed to deliver the subsequent I/O operations to the hybrid storage system by:

decreasing the rate at which the application is allowed to deliver subsequent I/O operations to the hybrid storage system during the second I/O cycle due at least in part to:

the amount of I/O operations handled by the high-speed storage device relative to the low-speed storage device; and the priority level assigned to the application relative to the other priority level assigned to the other application.

16. The system of claim 15, wherein the determination module decreases the rate at which the application is allowed to deliver the subsequent I/O operations to the hybrid storage system by factoring the amount of I/O operations handled by the high-speed storage device and the priority level assigned to the application into a formula used to calculate the rate at which the application is allowed to deliver the subsequent I/O operations to the hybrid storage system.

17. The system of claim 11, wherein:

the determination module further increases, due at least in part to the amount of I/O operations handled by the high-speed storage device relative to the low-speed storage device, a rate at which the other application is allowed to contribute to the subsequent I/O operations delivered to the hybrid storage system during the second I/O cycle; and the regulation module further regulates, based at least in part on the increased rate at which the other application is allowed to contribute to the subsequent I/O operations delivered to the hybrid storage system, the subsequent I/O operations in connection with the other application during the second I/O cycle.

18. The system of claim 11, wherein:

the regulation module regulates the subsequent I/O operations in connection with the application during the second I/O cycle by ensuring that the hybrid storage system does not handle a number of I/O operations that exceeds the number of allotted I/O credits in connection with the application during the second I/O cycle.

19. The system of claim 18, wherein the regulation module ensures that the hybrid storage system does not handle a number of I/O operations that exceeds the number of allotted I/O credits by at least one of:

preventing the application from delivering a number of I/O operations that exceeds the number of allotted I/O credits to the hybrid storage system during the second I/O cycle; and preventing the hybrid storage system from performing a number of I/O operations that exceeds the number of allotted I/O credits in connection with the application during the second I/O cycle.

20. A non-transitory computer-readable medium comprising one or more computer-executable instructions that, when executed by at least one processor of a computing device, cause the computing device to:

monitor, during a first Input/Output (I/O) cycle, at least one performance measurement of a hybrid storage system that handles I/O operations in connection with at least one application, the hybrid storage system comprising:

a high-speed storage device; and a low-speed storage device whose speed is slower than the high-speed storage device;

deduce, based at least in part on processing times of the I/O operations, an amount of the I/O operations handled by the high-speed storage device relative to the low-speed storage device during the first I/O cycle;

scale the priority level of the application by multiplying the priority level of the application by a scaling factor;

scale the other priority level of the other application by multiplying the other priority level of the other application by the scaling factor;

calculate a rate at which the application is allowed to deliver subsequent I/O operations to the hybrid storage system during a second I/O cycle based at least in part on:

the amount of I/O operations handled by the high-speed storage device relative to the low-speed storage device during the first I/O cycle;

an amount of I/O operations that originated from the application and were handled by the high-speed storage device during the first I/O cycle;

a user-specified percentage of the high-speed storage device;

the scaled priority level of the application;

a sum of the scaled priority level of the application and the other scaled priority level of the other application;

a total capacity of the hybrid storage system; and a duration of the second I/O cycle; and regulate the subsequent I/O operations in connection with the application during the second I/O cycle by allotting the application a certain number of I/O credits corresponding to the calculated rate at which the application is allowed to deliver the subsequent I/O operations to the hybrid storage system during the second I/O cycle.

* * * * *